(12) United States Patent
Carroll

(10) Patent No.: US 6,948,520 B2
(45) Date of Patent: Sep. 27, 2005

(54) FINE ADJUSTMENT GAS REGULATOR

(75) Inventor: Kent Carroll, Bolingbrook, IL (US)

(73) Assignee: Hose Shop, Ltd., Crystal Lake, IL (US)

( * ) Notice: Subject to any disclaimer, the term of this patent is extended or adjusted under 35 U.S.C. 154(b) by 273 days.

(21) Appl. No.: 10/397,720

(22) Filed: Mar. 26, 2003

(65) Prior Publication Data

US 2004/0187929 A1 Sep. 30, 2004

(51) Int. Cl.$^7$ .............................................. G05D 16/02
(52) U.S. Cl. .............................. 137/505.25; 137/505.27
(58) Field of Search ....................... 137/505.25, 505.27

(56) References Cited

U.S. PATENT DOCUMENTS

| | | | |
|---|---|---|---|
| 2,615,287 A | | 10/1952 | Senesky |
| 2,918,081 A | | 12/1959 | Lauer, Jr. |
| 3,437,109 A | * | 4/1969 | Egerer et al. .......... 137/505.25 |
| 3,474,822 A | | 10/1969 | Kuhn et al. |
| 3,848,631 A | | 11/1974 | Fallon |
| 3,890,999 A | | 6/1975 | Moskow |
| 3,926,208 A | | 12/1975 | Hoffman et al. |
| 4,064,890 A | | 12/1977 | Collins et al. |
| 4,181,139 A | | 1/1980 | Martini |
| 4,194,522 A | | 3/1980 | Lucas et al. |
| 4,226,257 A | | 10/1980 | Trinkwalder |
| 4,305,423 A | | 12/1981 | Adler |
| 4,450,858 A | | 5/1984 | Acomb |
| 4,484,695 A | * | 11/1984 | Fallon et al. .......... 137/505.25 |
| 4,785,847 A | | 11/1988 | Steer et al. |
| 5,086,807 A | | 2/1992 | Lasnier et al. |
| 5,123,442 A | | 6/1992 | Geuy et al. |
| 5,234,026 A | | 8/1993 | Patterson |
| 5,280,778 A | | 1/1994 | Kotsiopoulos |
| 5,368,022 A | | 11/1994 | Wagner |
| 5,392,825 A | | 2/1995 | Mims et al. |
| 5,411,053 A | | 5/1995 | Markham et al. |
| 5,522,421 A | | 6/1996 | Holt et al. |
| 5,669,369 A | * | 9/1997 | Scott ..................... 137/505.25 |

* cited by examiner

*Primary Examiner*—Stephen M. Hepperle
(74) *Attorney, Agent, or Firm*—Welsh & Katz, Ltd.

(57) ABSTRACT

An adjustable pressure regulator controls the flow of a gas from a high pressure source to a low pressure device at a predetermined outlet pressure. The regulator includes a body, a piston assembly carried by the body. The assembly has a piston, a flow conduit formed in the piston and a biasing element operably connected to the piston. The flow conduit has a regulated pressure outlet end. The piston and flow conduit are movable longitudinally in the body. A retainer element is engageable with the body and is movable toward and away from the body and the piston. A seat is carried by the retainer element and is movable therewith. The seat is engaged by the flow conduit to isolate a flow path through the regulator and disengaged from the flow conduit to provide a flow path through the flow conduit. The piston assembly biasing element biases the flow conduit away from the seat to open a flow path through the regulator. Gas pressure on the piston urges the flow conduit into contact with the seat to close the flow path through the regulator. The retainer element and seat are movable toward and away from the body to vary a distance of movement of the flow conduit toward and away from the seat to vary the predetermined outlet pressure.

8 Claims, 3 Drawing Sheets

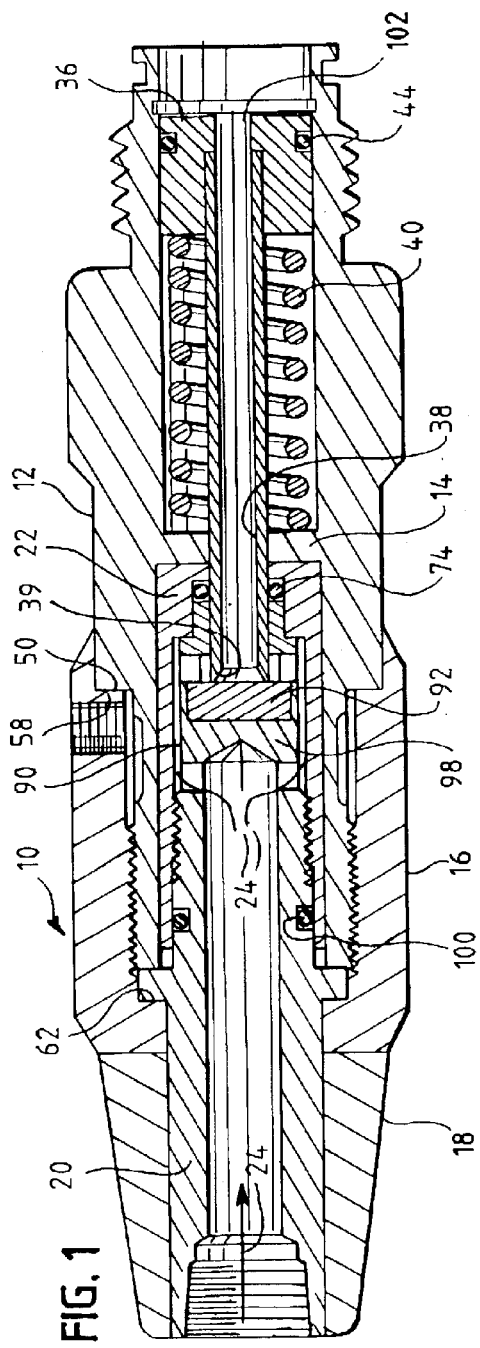
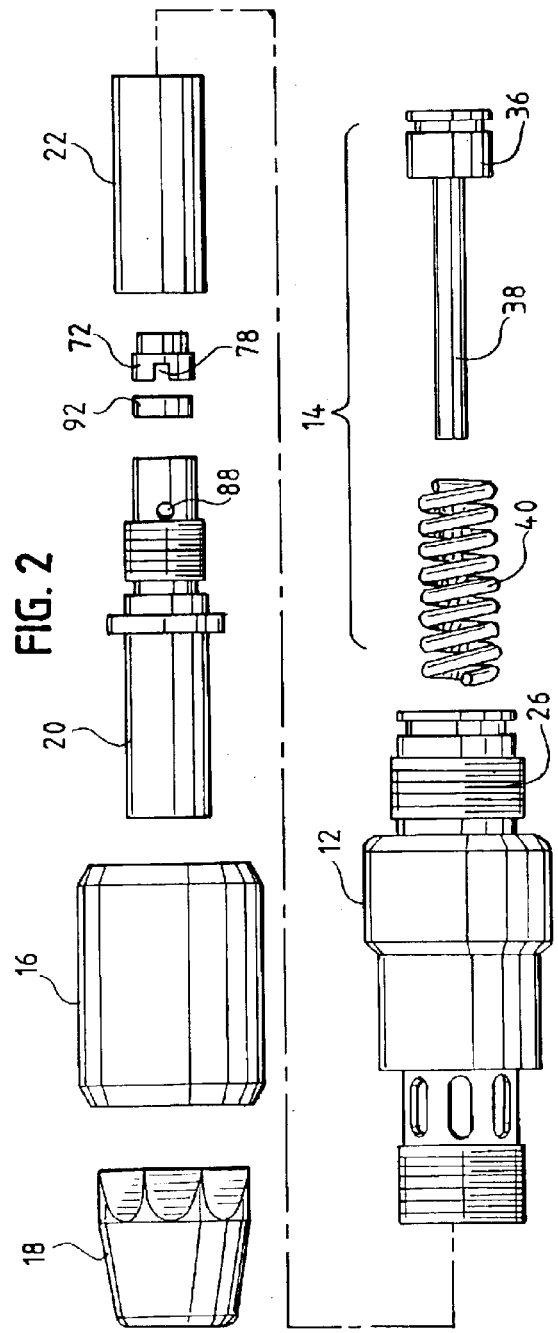

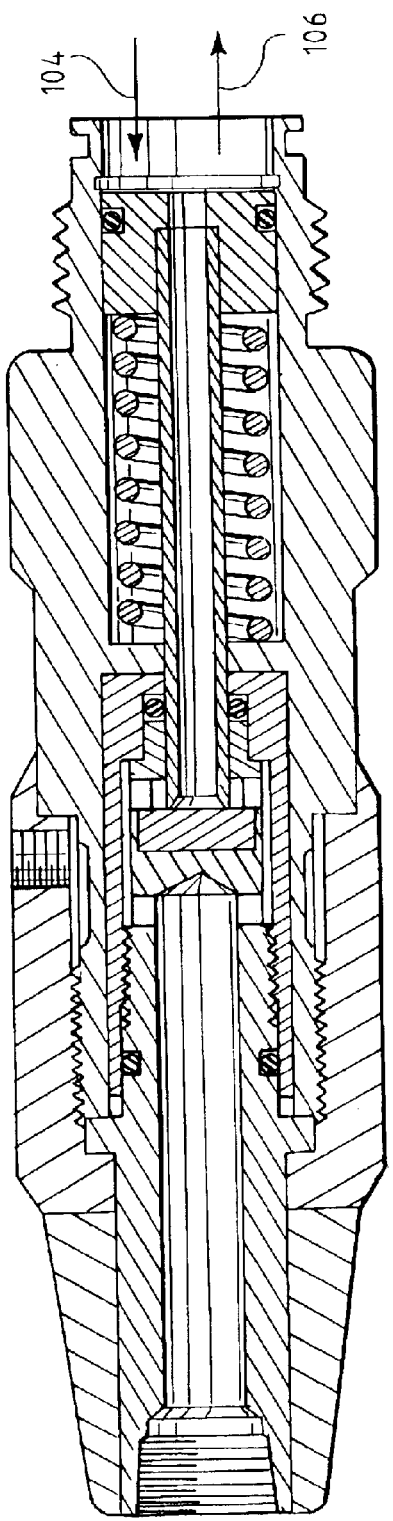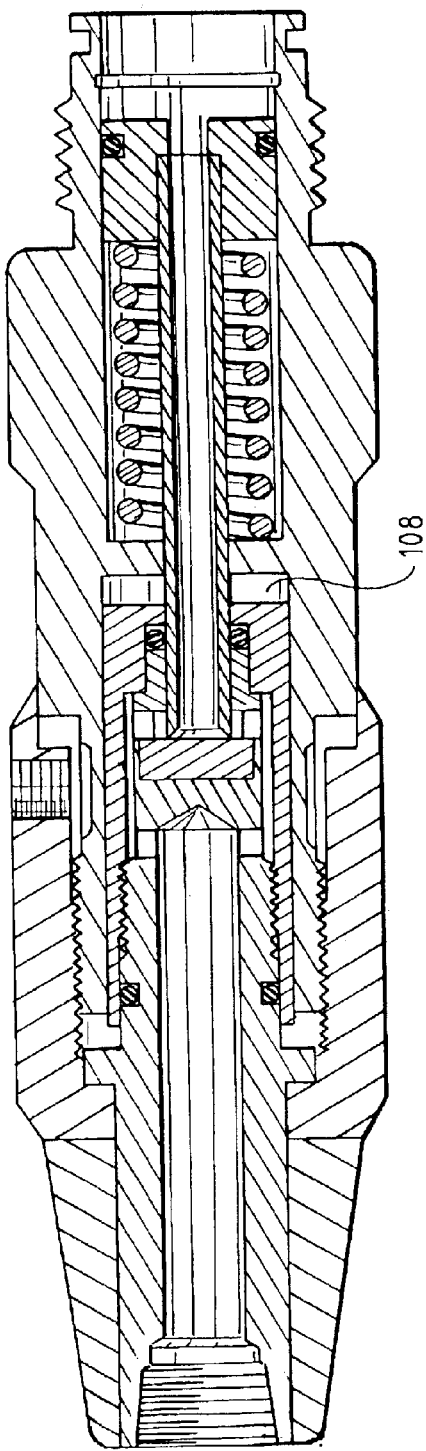

FINE ADJUSTMENT GAS REGULATOR

BACKGROUND OF THE INVENTION

The present invention is directed to a novel pressure regulator. More particularly, the present invention relates to a fine adjustment, adjustable pressure regulator for use in paint ball guns that use compressed gas to fire projectiles. The present invention is also adapted for use with other pressurized gas devices.

Sporting events that provide the participant with an adventure in military strategy and the feel of the fear and exhilaration of battle have become very popular. Generally participants are equipped with a gas projectile gun or rifle (which can launch a projectile without seriously harming the victim) and protective gear and are divided into two or more combat groups each with the goal of surviving the others.

One such sporting event is commonly referred to as "paintball". In this event, participants fire paint-filled projectile balls at one another. In a typical paintball event, participants fire projectiles, or paintballs, at one another and, when struck, are "painted" by the paint ball. The objective of such an event is to be the last person that has not been "painted" or hit with a projectile.

Typically, the projectiles used in these events are propelled, generally using a compressed gas to avoid the potential dangers of explosives such as gun powder. The dangers of explosives include not only the physical danger of the explosion but also the increased speed that such explosions impart to projectiles, potentially making innocuous projectiles, such as paintballs, deadly. Moreover, compressed gas is less costly than explosives and is readily obtainable.

When these types of systems are used, compressed gas is provided or supplied from a high-pressure source carried by the participant in a gas bottle. Although high-pressure gas is needed at the gun firing mechanism to propel the paint balls, typically the pressure in these bottles is greater than the pressure needed to safely propel the projectile within the parameters of the game. As such, it is necessary to regulate the pressure of the compressed gas provided to the gun firing mechanism to allow projectiles to be launched at a safer velocity and prevent damage to the gun. Typically, a regulator is provided, mounted to the gun or the compressed gas bottle. That is, it is carried by the game participant.

Known pressure regulator can be quite large and as such can add considerable weight to the gun. In that one of the objectives of paint ball is to avoid one's opponent, any added weight is undesirable.

Moreover, although many such regulators in fact function well to regulate and reduce pressure from the bottle to the firing mechanism, often such pressure regulation or reduction is rough. That is, the outlet pressure is typically within a range that is specified for the particular gun. However, there remains an "optimum" pressure for the mechanism to operate.

Accordingly, there exists a need for a pressure regulator that can be easily adjusted to provide a downstream or outlet pressure. Desirably, such a regulator is sufficiently small and light-weight so that it does not increase, to any extent, the weight carried by a participant in a paint ball sporting event. More desirably such a regulator provides a precisely controlled "fine-tuned" downstream pressure that can be set for optimum gun performance.

BRIEF SUMMARY OF THE INVENTION

An adjustable, fine adjustment gas regulator is configured to provide a precisely controlled downstream pressure that is regulated, essentially regardless of the upstream pressure. The regulator is used to control the flow of a gas from a high pressure source to a low pressure device. The gas is delivered from the regulator at a predetermined outlet pressure.

The regulator includes a body. A piston assembly is carried by the body. The assembly has a piston, a flow conduit formed in the piston and a biasing element, preferably a coil spring, operably connected to the piston. The flow conduit has a regulated pressure outlet end. The piston and flow conduit are movable longitudinally in the body.

A retainer element is engageable with the body and movable is toward and away from the body and the piston. A seat is carried by the retainer element and is movable with the retainer element. The seat is engaged by the flow conduit to isolate a flow path through the regulator and disengaged from the flow conduit to provide a flow path through the flow conduit. The regulator includes an inlet in flow communication with the retainer element.

The piston assembly biasing element biases the flow conduit away from the seat to open a flow path through the regulator. Gas pressure on the piston urges the flow conduit into contact with the seat to close the flow path through the regulator. The outlet pressure is varied or adjusted by moving the retainer element and seat toward and away from the body. This varies the distance of movement of the flow conduit toward and away from the seat thus varying the outlet pressure.

To provide the adjustment, the pressure regulator includes an adjusting collar operably connected (preferably threaded) to the body and operably connected to the retainer element and seat. As the collar threads onto and off of the body, it moves the retaining element and the seat toward and away from the flow conduit.

The regulator includes an inner shaft, a seal retainer and a retaining block that all move with the adjusting collar toward and away from the piston. This assembly supports the seat and provides gas passages through the regulator. A high pressure gas clearance is defined between the inner shaft and the seal retainer and a gas path is defined from the inlet to the high pressure gas clearance and from the high pressure gas clearance to the to the seat and flow conduit.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 1 is a cross-sectional view of a fine adjustment gas regulator embodying the principles of the present invention;

FIG. 2 is an exploded view of the gas regulator of FIG. 1;

FIG. 3 is a cross-sectional view of the gas regulator as it is set for a lower downstream or outlet pressure;

FIG. 4 is a cross-sectional view of the gas regulator (showing a view similar to FIG. 3), in which the regulator is set for a higher downstream or outlet pressure;

DETAILED DESCRIPTION OF THE INVENTION

Figure 5:
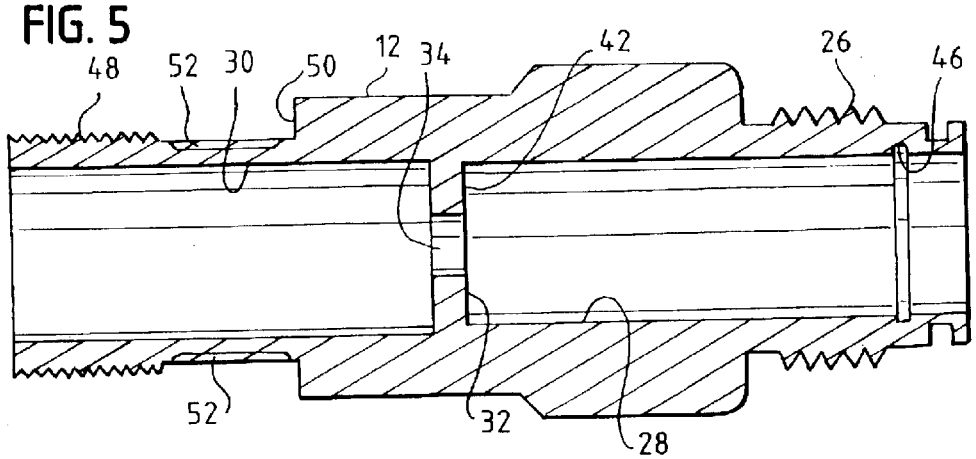
FIG. 5 is a cross-sectional view of the main body of the regulator.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures, and in particular to FIG. 1, a present regulator 10 is configured to provide a precisely controlled downstream pressure that is regulated, essentially regardless of the upstream pressure. The regulator 10 includes generally, a main body 12, a piston assembly 14 disposed within the body 12, an adjusting collar 16 that is rotatable relative to the body 12 (to provide the downstream pressure adjustment), a trim or nose piece 18, and an inner shaft or inner tube 20 that extends from the main body 12 to the trim piece 18. A seal retainer 22 is disposed in the main body 12, between the main body 12 and the inner shaft 20.

Gas flow is into the regulator 10 is (as indicated by the arrow at 24), into the inner shaft 20 at the trim piece 18. Gas flows out of the regulator 10 through the piston assembly 14, as at the main body 12. To this end, the inner shaft 20 or inlet end may be referred to as "upstream" or an upstream end, whereas the main body 12 end, at the outlet at the piston assembly 14 may be referred to as "downstream" or a downstream end.

Referring now to FIGS. 1 and 5, the main body 12 includes a male threaded downstream end 26 to which the regulator 10 is mounted, for example, to an air gun receiver (not shown). The main body 12 defines a piston cavity 28 (in the downstream end), and a seal retainer cavity 30 at an upstream end, that are separated from one another by a pocket wall 32. The pocket wall 32 has an opening 34 therethrough.

As seen in FIGS. 1 and 2, the piston assembly 14 is positioned within the piston cavity 28. The piston assembly 14 includes a piston 36 that extends across the cavity 28, a flow conduit or tube 38 fixedly mounted to the piston 36 (as by brazing), and a biasing element, such as the illustrated coil spring 40, disposed about the tube 38, between the piston 36 and the piston cavity pocket floor 42. Those skilled in the at will recognize that the biasing feature can be provided by various other elements, such as spring washers and the like.

The tube 38, which is hollow, is positioned in and extends through the opening 34 in the pocket floor 42 and extends into the piston 36 thus providing a gas passage through the piston 36. The tube 38 can have a beveled edge 39. A seal, such as the exemplary O-ring 44 is positioned on the piston 36 to seal the piston cavity 28 from the environs. A spring clip or the like (not shown) is positioned in a channel 46 in an inner surface of the piston cavity 28 so that the action of the spring 40 does not force the piston assembly 14 out of the cavity 28. That is, the clip retains the piston assembly 14 within the cavity 28.

The main body 12 further includes an externally threaded upstream end 48 and a step or shoulder 50 in the body 12 intermediate the (threaded) upstream end 48 and the downstream end 26. A plurality of recesses 52 are longitudinally formed in the main body 12, circumferentially disposed about the body 12, between the threaded upstream end 48 and the shoulder 50.

Figure 6:
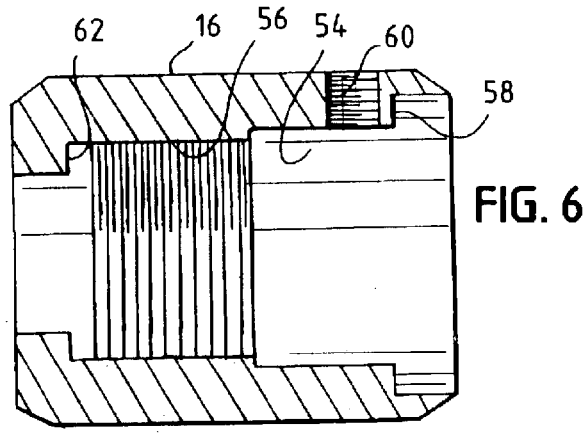
FIG. 6 is a cross-sectional view of the adjusting collar.

The main body 12 is configured for engagement with the adjusting collar 16, best seen in FIG. 6. The adjusting collar 16 includes a cavity 54 having an internal thread 56 for mating with the external upstream end 48 threads of the main body 12. An internally formed step 58 in the collar 16, spaced from the threads 56, is configured for engagement with the main body shoulder 50 to provide a limit for threading the main body 12 into the collar 16. A transverse threaded opening 60 is formed in the collar 16 for receiving a set screw or other adjustment securing element (not shown). At an upstream end of the collar, an internal, inwardly extending stop wall 62 is formed.

Figure 9:
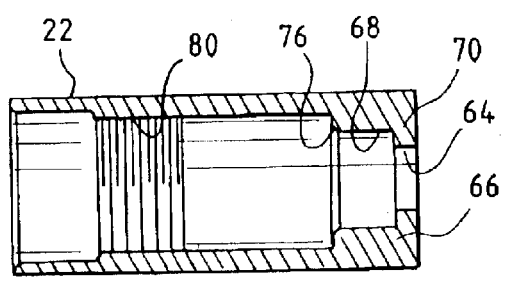
FIG. 9 is a cross-sectional view of the seal retainer.

Referring to FIGS. 5 and 9, the seal retainer 22 is positioned in the main body seal retainer cavity 30. The seal retainer 22 is an elongated cup-shaped element that includes an opening 64 in a base portion 66 of the element for receiving the piston assembly flow tube 38. The seal retainer 22 is configured to retain or support the pressure reducing components. To this end, the seal retainer 22 includes a well 68 at the downstream end (adjacent the base 66) within which the opening 64 is formed. A lip 70 extends inwardly to define the well 68.

Figure 7:
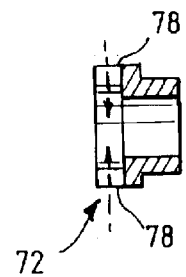
FIG. 7 is a cross-sectional view of the retaining block.

A retaining block 72, illustrated in FIG. 7 is disposed within the seal retainer well 68 and a seal, such as the illustrated O-ring 74 is positioned within the well 68, to form a seal at the well opening 64/flow tube 38/retaining block 72 interface. The retaining block 72 has a step-like shape and sits on a mating shoulder 76 of the seal retainer well 68. The retaining block 72 defines a plurality of gas passages 78 therethrough. The seal retainer 22 includes an internal thread 80 at the upstream end.

Figure 8:
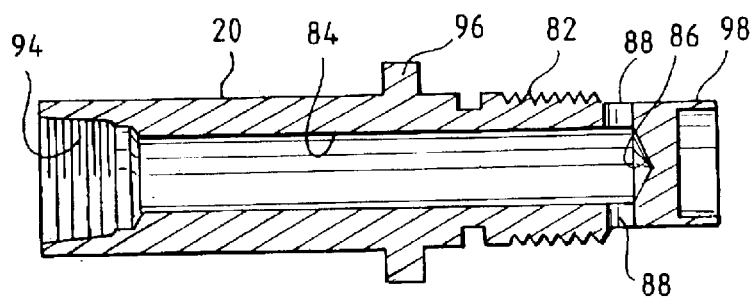
FIG. 8 is a cross-sectional view of the inner shaft.

The inner shaft 20, best seen in FIG. 8, includes an external thread 82 and matingly threads with the seal retainer 22. The inner shaft 20 has an inner bored-out region 84 and terminates at a sealed end 86. A plurality of gas passages 88 extend between the inner bored-out region 84 and an external portion of the shaft 20. In that the seal retainer 22 and the inner shaft 20 are threadedly engaged with one another, they function as a single, unitary element. That is, as will be described below, they move with one another, relative to the regulator main body 12. A space between the shaft 20 and seal retainer 22 defines a high pressure gas clearance 90 (FIG. 1).

A seal or seat 92 is positioned within the seal retainer 22, on the retaining block 72. The seat 92 is disposed at a downstream end 98 of the inner shaft 20. The seat 92 is configured as a stop block for the flow tube 38 to bear against to initiate and terminate gas flow through the regulator 10. In a present regulator 10, the seat 92 is formed from a resilient material, such as neoprene. The inner shaft 20 further includes an internally threaded inlet or upstream end 94 and a set wall 96 extending outwardly intermediate the upstream 94 and downstream 98 ends thereof. To assure a gas tight seal between the inner shaft 20 and the seal retainer 22, a seal, such as the exemplary O-ring 100 is disposed at the upstream or high pressure end 94 of the threaded interface.

The trim piece or nose piece 18 is fitted onto the upstream end 94 of the inner shaft 20 externally thereof. In a present regulator 10, the trim piece 18 is press fitted onto the inner shaft 20 so that the trim piece 18 and shaft 20 (like the inner shaft 20 and seal retainer 22) function as a single unitary element.

In operation, gas enters the upstream end 94 of the inner shaft 20 and flows through the regulator as indicated by the flow arrows at 24. The gas flows into the inner shaft bored-out region 84 and through the gas ports 88, into the gas clearance 90. The gas then flows from the clearance 90 through the gas ports 78 in the retaining blocks 72. If, as seen in FIGS. 1 and 2, the flow tube 38 is bearing against the seat 92, the flow of gas is stopped at the flow tube 38/seat 92 interface. When, however, the tube 38 is spaced from the seat 92 (as the piston 36 is urged outwardly by the spring 40 force), gas flows into the space between the tube 38 and seat 92, and flows out of the tube 38 at the downstream or piston end 102.

The seating and unseating of the tube 38 on the seat 92 is determined by the downstream pressure, that is, the pressure exerted by downstream gas on the piston 36. As seen in FIG. 2, which shows the tube 38 seated on the seat 92 (and thus downstream isolation), the downstream pressure is sufficiently high at the piston 36 to overcome the spring 40 force. That is, the gas pressure on the piston 36 is sufficiently high to urge the piston 36 (in the direction as indicated by the arrow at 104) to seal the flow passage through the tube 38. As the downstream pressure begins to drop, the force of (or pressure induced by) the gas on the piston 36 is commensurately reduced. The spring 40 force thus overcomes the gas pressure force, which in turn urges the piston (in the direction indicated by the arrow at 106) to open the regulator 10. This moves the tube 38 from (i.e., off of ) the seat 92, permitting gas flow through the regulator 10. Once the downstream pressure has increased sufficiently, the regulator cycles and the spring 40 force is overcome (by the gas force induced on the piston 36), and the tube 38 begins to seat, again isolating regulator 10 flow.

The downstream or outlet pressure is readily set by varying the amount of movement of the spring 40 that is required to isolate the outlet side flow. That is, by increasing the distance that the spring 40 is required to move the tube 38 to seat on the seat 92, the outlet pressure can be increased. Conversely, by decreasing the amount of spring 40 travel, the tube 38 seats "earlier" in the travel, thus reducing the downstream pressure.

The relative required movement of the spring 40 is readily accomplished by adjusting the adjusting collar 16 relative to the main body 12. As set forth above, the inner shaft 20 and the seal retainer 22 are fixedly mounted to one another by a threaded mounting 80/82. Likewise, the inner shaft 20 and trim piece 18 are fixedly mounted to one another by the press fit of the trim piece 18 onto the inner shaft 20. Thus, the trim piece 18, inner shaft 20 and seal retainer 22 all move together as a single unitary element.

The adjusting collar 16 moves longitudinally along with the trim piece 18/shaft 20/seal retainer 22 element. This is assured by the clearance fit of the adjusting collar 16 between the trim piece 18 end and the shaft set wall 96. And, longitudinal movement of the trim piece 18/shaft 20/seal retainer 22 element is effected by rotating the adjusting collar 16 relative to the main body 12 (about their respective mating threads 48/56).

Referring to FIGS. 3 and 4, the regulator 10 is shown set for a low or minimum outlet pressure (FIG. 3) and for a high or maximum outlet pressure (FIG. 4). A comparison of these figures shows that at a minimum outlet pressure, the seal retainer 22 is fully seated in the main body seal retainer cavity 30. In this manner, the spring 40 is at a lesser compressed state to seat the tube 38 on the seat 92. At this setting, less pressure is required on the piston 36 to (compress the spring 40) to move the piston assembly 14 to seat the tube 38 on the seat 92.

Conversely, as seen in FIG. 4, when the regulator 10 is adjusted to move the trim piece 18/shaft 20/seal retainer 22 element away from the "bottom" of the seal retainer cavity 30 (see gap at 108), the spring 40 is required to move (compress) a greater distance to seat the tube 38 on the seat 92. As such, a greater pressure is required on the piston 36 to overcome the spring 40 force and to move (or seat) the tube 38.

As set forth above, once the regulator 10 is "set" for a desired outlet pressure, it can be locked into position. In a present regulator 10, once a desired outlet pressure is achieved, the set screw (not shown) is threaded into the adjusting collar set screw opening 60. This seats the set screw into one of the longitudinal recesses 52 in the main body 12, thus preventing rotation of the adjusting collar 16 relative to the main body 12.

In a present regulator 10, the seat 92 and the various seals (or O-rings) 44, 74, 100 are formed from a resilient, polymeric material, such as neoprene and the like. The various pressure retaining and structural elements are formed from metals, such as steel, aluminum and the like. Those skilled in the art will recognize other materials from which the regulator 10 and components can be formed.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. An adjustable pressure regulator for controlling the flow of a gas from a high pressure source to a low pressure device, the gas being delivered from the regulator at a predetermined outlet pressure, comprising:

a body;

a piston assembly carried by the body, the piston assembly having a piston, a flow conduit formed in the piston and a biasing element operably connected to the piston, the flow conduit having a regulated pressure outlet end, the piston being movable longitudinally in the body;

a retainer element engageable with the body and movable toward and away from the body and the piston, the retainer element includes a seal retainer and a retaining block, the retaining block having at least one gas passage therethrough;

a seat carried by the retainer element and movable therewith, the seat being engaged by the flow conduit to isolate a flow path through the regulator and disengaged from the flow conduit to provide a flow path through the flow conduit; and an inlet in flow communication with the retainer element;

an adjusting collar operably connected to the body and operably connected to the retainer element and the seat, the adjusting collar being longitudinally movable along the body to longitudinally move the retaining element and the seat toward and away from the flow conduit;

and an inner shaft fixedly connected to the seal retainer and defining a high pressure gas clearance therebetween, the inner shaft providing a gas path from the inlet to the high pressure gas clearance and wherein the retaining block gas passage provides flow communication from the high pressure gas clearance to the to the seat and flow conduit;

wherein the piston assembly biasing element biases the flow conduit away from the seat to open a flow path through the regulator and wherein gas pressure on the piston urges the flow conduit into contact with the seat to close the flow path through the regulator, and wherein the retainer element and seat are movable toward and away from the body to vary a distance of movement of the flow conduit toward and away from the seat to vary the predetermined outlet pressure.

2. The adjustable pressure regulator in accordance with claim 1 including a trim piece fixedly connected to the inner shaft and engageable with the adjusting collar, wherein movement of the adjusting collar longitudinally moves the inner shaft, seal retainer and seat relative to the piston assembly.

3. The adjustable pressure regulator in accordance with claim 2 wherein the adjusting collar includes a thread and wherein the body includes a mating thread and wherein the adjusting collar is rotatable relative to the body for longitudinal movement therealong.

4. The adjustable pressure regulator in accordance with claim 3 wherein the adjusting collar includes a lock for locking the collar relative to the body.

5. The adjustable pressure regulator in accordance with claim 1 wherein an end of the flow conduit has a beveled edge.

6. An adjustable pressure regulator for controlling the flow of a gas from a high pressure source to a low pressure device, the gas being delivered from the regulator at a predetermined outlet pressure, comprising:

a body defining a piston cavity and a seal retainer cavity, the cavities being separated from one another by a pocket wall having a central bore therethrough;

a piston assembly carried by the body, the piston assembly having a piston disposed within the piston cavity, a flow conduit formed in the piston extending through the pocket wall bore and a biasing element positioned between the piston and the pocket wall, the flow conduit having a regulated pressure outlet end, the piston being movable longitudinally in the body;

a seal retainer disposed in the seal retainer pocket, the seal retainer defining a well and having a central bore therein for receiving the flow conduit, the well defining a step;

a retaining block disposed, in part, within the well, the retaining block defining an opening therein for passage of the flow conduit, the retaining block having a gas passage therein;

an inner shaft fixed connected to the seal retainer and defining a gas clearance between the inner shaft and the seal retainer, the inner shaft being in flow communication with the high pressure source and including a gas passage into the gas clearance;

a seat positioned between the inner shaft and the retaining block end configured for engagement by the flow conduit to terminate flow through the regulator and to disengage from the flow conduit to permit flow through the regulator; and a trim piece fixedly connected to the inner shaft and engageable by the adjusting collar to longitudinally move the inner shaft away from the piston, wherein the inner shaft, the seal retainer, the retaining block and the seat are movable together, toward and away from the piston to vary the predetermined outlet pressure independent of a pressure of the high pressure source.

7. The adjustable pressure regulator in accordance with claim 6 including an adjusting collar operably connected to the body and carrying at least a portion of the seal retainer and the inner shaft, and wherein rotation of the adjusting collar relative to the body provides longitudinal movement of the inner shaft, the seal retainer, the retaining block and the seat toward and away from the piston.

8. The adjustable pressure regulator in accordance with claim 7 including a stop wall on the inner shaft engageable with the adjusting collar to move the inner shaft toward the piston.

* * * * *